United States Patent [19]
Kajitani et al.

[11] Patent Number: 5,501,310
[45] Date of Patent: Mar. 26, 1996

[54] MOTORCYCLE CLUTCH DEVICE

[75] Inventors: Koji Kajitani, Kyoto; Hiroshi Mizukami, Neyagawa; Norihisa Uenohara, Ibaraki, all of Japan

[73] Assignee: Kabushiki Kaisha Daikin Seisakusho, Osaka, Japan

[21] Appl. No.: 289,361

[22] Filed: Aug. 11, 1994

[30] Foreign Application Priority Data

Aug. 20, 1993 [JP] Japan .................................. 5-206640
Aug. 20, 1993 [JP] Japan .................................. 5-206641

[51] Int. Cl.$^6$ ................................................ F16D 13/22
[52] U.S. Cl. .................... 192/48.3; 192/48.92; 192/52.6; 192/55.7; 192/70.27
[58] Field of Search ................... 192/48.3, 52, 109 A, 192/70.21, 89.24, 89.22, 70.27, 48.92, 52.6, 55.7

[56] References Cited

U.S. PATENT DOCUMENTS

| | | | |
|---|---|---|---|
| 2,926,765 | 3/1960 | Heid | 192/48.92 X |
| 3,072,234 | 1/1963 | Maurice et al. | 192/48.3 |
| 3,739,896 | 6/1973 | Shono | 192/70.27 |
| 4,518,070 | 5/1985 | Ooka | 192/96 X |
| 4,723,643 | 2/1988 | Numazawa et al. | 192/48.92 X |
| 5,284,232 | 2/1994 | Prud'Homme | 192/52 X |

FOREIGN PATENT DOCUMENTS

| | | | |
|---|---|---|---|
| 124627 | 7/1947 | Australia | 192/48.3 |
| 1090629 | 4/1955 | France | 192/48.3 |
| 1-30929 | 2/1989 | Japan | 192/109 A |
| 2-209626 | 8/1990 | Japan | 192/109 A |
| 753732 | 8/1956 | United Kingdom | 192/48.3 |
| 2260169 | 4/1993 | United Kingdom | 192/109 A |

*Primary Examiner*—Rodney H. Bonck
*Attorney, Agent, or Firm*—Shinjyu Office of Patent Attorney

[57] ABSTRACT

A clutch device comprises an input part 3 to which power from a crankshaft 2 is inputted, an output part disposed concentrically with the input part 3 and connectable to an input shaft of a transmission, a clutch body 5, a pressure plate 40, and a main cone spring 41. The clutch body 5 has friction discs 20 and 21 connected to the input part 3 and a driven plate 31 connected to the output part 4. The pressure plate 40 presses the friction discs 20 and 21 and the driven plate 31 against each other. The main cone spring 41 urges the pressure plate 40 so that the friction discs 20 and 21 and the driven plate 31 are pressed against each other. Further, the friction disc 21 is provided with serrations or teeth 21$a$ on an inner radial surface thereof. The input part 3 is provided with retractable gear teeth 23 which engage the teeth 21$a$ to allow for rotation of the friction disk 21 with the input part 3 in one rotational direction but not in the other rotational direction.

17 Claims, 4 Drawing Sheets

MOTORCYCLE CLUTCH DEVICE

BACKGROUND OF THE INVENTION

The present invention relates generally to a clutch device, and more particularly, to a clutch device having clutch disk cushioning means such that during engagement and disengagement of the clutch the biasing of the clutch pressure plate combined with the cushioning means provides a force displacement response of the pressure plate that is at least partially nearly linear. The clutch device further Includes a torque limiter for reducing the adverse effects of the use of the engine as a brake.

Motorcycles are typically provided with a clutch device for selectively transmitting rotary power between the crankshaft of an internal combustion engine mounted to the motorcycle frame and the input shaft of a transmission also mounted to the motorcycle frame. Such clutch devices are generally mounted proximate the input shaft of the transmission. Power Is transmitted to an input part of the clutch device through a gear train from the crankshaft of the engine, and is transmitted to the input shaft of the transmission through a clutch body and a clutch output part.

Some clutch devices used oil motorcycles are of a multiple disc type in which a plurality of clutch plates are disposed side by side within the clutch assembly. In such a clutch assembly, there are usually at least two clutch plates. One plate is coupled to rotate with the crankshaft of the engine and one plate is coupled to rotate with the input shaft of the transmission. A pressure plate within the clutch device, usually spring biased, selectively exerts a compressive force against the plates so that they rotate together to transmit rotary power therebetween. The pressure plate is usually connected to a release mechanism such as a lever on the handlebar of the motorcycle. The pressure plate is engaged and disengaged via movement of the lever. The clutch is engaged to transmit rotary power when the plurality of clutch plates are compressed by the pressure plate, and are disengaged when the pressure plate is moved against the force of the spring biasing so that the clutch plates may rotate independent of each other.

In the above described conventional clutch device, a plurality of coil springs are used so as to bias the pressure plate. To effect disengagement of the clutch, the pressure plate is moved against an urging force of the coil spring using the release mechanism. As the pressure plate is moved to disengage the clutch, the coil springs are compressed. The load characteristics of the coil springs are typically linearly sloped, such that, as the springs are compressed, a linearly increasing force must be exerted against the springs to further compress the springs. As a consequence, the force exerted by a motorcyclist via the handlebar lever must gradually increase as the clutch releasing operation progresses. It Is therefore often difficult for motorcyclists to smoothly perform the clutch engaging and disengaging operations. Often, when such clutches are engaged, the motorcyclist will experience a jolt or a shock if the clutch engages too quickly, i.e if the clutch lever on the handlebar is released to quickly.

Some industrial clutch devices are equipped with a cushion spring which opposes the biasing of the coil springs in order to alleviate the shock experienced when the clutch is engaged. The purpose of such a cushion spring is to protect expensive equipment. In such an industrial clutch, when the cushioning properties of the cushion spring and the load characteristics of the coil spring are combined with each other, the release load characteristics become parabolic rather than linearly sloped (i.e. the response experienced upon movement of the clutch engagement mechanism becomes parabolic). The release load characteristics are such that the force necessary to release the clutch (i.e. to move the pressure plate) rapidly increases as the releasing operation is performed, thereby making It difficult to smoothly perform the releasing operation.

The rotary power provided by an engine is normally used to move a vehicle. However, it is also possible to use the torque of an engine to stop or slow a vehicle down by engaging the clutch when the transmission input shaft is rotating at a faster speed than the crankshaft of the engine. When the slower rotary torque of an engine is used to slow a vehicle down, is referred to as an engine brake. In automotive applications, use of the engine as a brake is common practice. However in a motorcycle, engine braking can be dangerous. If the engine brake is applied too rapidly, the rear motorcycle tire may, in some cases, slip. Tire slippage may cause the motorcyclist to lose control of the motorcycle. The results can be disastrous.

SUMMARY OF THE INVENTION

According to one aspect of the present invention, a clutch device for transmitting and disconnecting power between the crankshaft of a motorcycle engine and the input shaft of a manual transmission includes an hub assembly coupleable to the crankshaft of an engine, a first friction disk member coupled to the hub assembly for rotation therewith, a clutch case couplable to an input shaft of a transmission, at least a second friction disk member coupled to the clutch case for rotation therewith and engageable with the first friction disk. A pressure plate is supported on the clutch case and is biased for pressing the friction disks into contact with each other within the clutch case.

The pressure plate is biased against the friction disks by a conical disk shaped spring. The cone spring response characteristics are in the shape of a multi-dimensional curve having a maximum value and minimum values. The shape of the curve (see FIG. 3, curve P1) is such that it is possible to initially set the spring to provide biasing to the pressure plate that allows for a release load that decreases as a clutch disengagement process commences.

In another aspect of the invention, an elastic member for cushioning is provided within the clutch case adjacent to the first clutch disk to oppose the force of the cone spring. When the load characteristics of the cone spring and the load characteristics of the elastic member are combined with each other, the release force characteristics are almost flattened to a near linear response curve. As a result, the force necessary to engage and disengage the clutch remains almost constant throughout a portion off the movement of the pressure plate, thereby to make it possible to smoothly perform the clutch releasing operation.

A clutch device according to another aspect of the present invention further includes a torque limiter mechanism. The torque limiter mechanism includes a secondary clutch disk that is coupled to the clutch body via engagement and disengagement of the pressure plate. Serrations are provided on an inner radial surface of the secondary clutch disk. An outer radial portion of the hub assembly is provided with a plurality of radially retractable gear teeth configured to engage the serrations to allow for rotation of the second friction disk with respect to said hub assembly in a first direction and to cause rotation therewith in a second direction.

The secondary clutch disk is engagable with the second and first clutch disks via the pressure plate biasing. However, upon use of the engine as a brake, the secondary clutch disk does not transmit rotatory power between the crankshaft of the engine and the clutch case due to the retractable gear teeth in the hub assembly.

If the engine brake is rapidly applied, the torque capacity of the clutch device is decreased, whereby the hub assembly and clutch disk plates function as a torque limiter. Therefore, the risk of tire slippage can be reduced, thereby providing a greater degree of stability to a motorcycle when applying an engine brake.

The foregoing and other objects, aspects and advantages of the present invention will become more apparent from the following detailed description.

DESCRIPTION OF THE PREFERRED EMBODIMENTS

Figure 1:
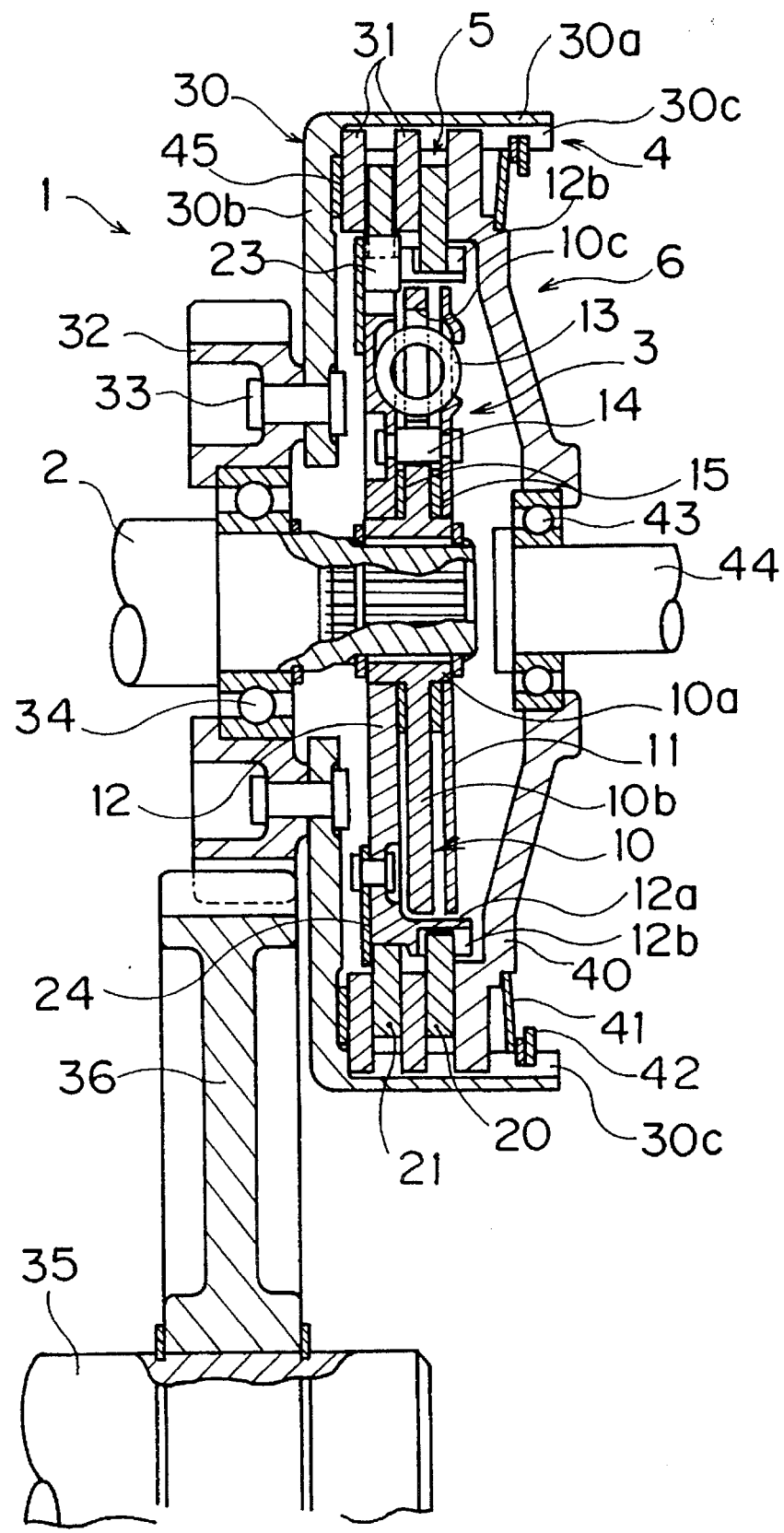
FIG. 1 is a side section showing a clutch device employing one embodiment of the present invention.

FIG. 1 illustrates a clutch device for a motor bicycle according to one embodiment of the present invention.

The clutch device 1 is mounted on an end of a crankshaft 2 or an internal combustion engine (not shown) on a motorcycle (not shown), and has an input part 3, an output part 4, a clutch body 5 disposed between the input part 3 and the output part 4, and a pressing mechanism 6 for engaging and disengaging the clutch body 5 (transmitting and disconnecting power). The pressing mechanism 6 may be connected to any of a variety or control devices, such as a cable (not shown) connected to a lever (not shown) mounted on the handlebars or a motorcycle.

The input part 3 is mounted on the end of the crankshaft 2. The input part 3 has a spline hub 10, a disc-shaped retaining plate 11 disposed on a side surface of the spline hub 10 on the side of the pressing mechanism 6, and a disc-shaped clutch plate 12 disposed opposite the retaining plate 11 with the spline hub 10 interposed therebetween. The spline hub 10 has a boss 10a in its central portion, and has a disc-shaped flange 10b in its radially outer portion.

A spline hole is formed in a radially inner portion of the boss 10a, and is engaged with a spline shaft on the end of the crankshaft 2. A plurality of window holes 10c are formed in the flange 10b, and a torsion spring 13 serving as a damper mechanism is accommodated in the window holes 10c. Both sides of the torsion spring 13 are supported by the retaining plate 11 and the clutch plate 12.

The retaining plate 11 and the clutch plate 12 are fixed in the axial direction and in the direction of rotation by a stop pin 14. The stop pin 14 passes through the flange 10b of the spline hub 10, and the stop pin 14 and the spline hub 10 are relatively rotatable within a predetermined angle range. In addition, a pair of friction washers 15 is disposed in a radially inner portion of the flange 10b of the spline hub 10 so as to be respectively held by the retaining plate 11 and the clutch plate 12.

A cylinder part 12a extending toward the pressing mechanism 6 is formed in a radially outer portion of the clutch plate 12. Formed on the side of the pressing mechanism 6 in a radially outer portion of the cylinder part 12a is a spline shaft 12b, with which a first friction disc 20 constituting the clutch body 5 is engaged. The first friction disc 20 is axially movable relative to the cylinder part 12a but is fixed thereto in the direction of rotation due to engagement with the spline shaft 12b. Friction members are disposed on each side of the first friction disc 20 in the form of a pressure plate 40 and one of a plurality of driven plates 31, as is described in further detail below.

A second friction disc 21 includes one way clutch mechanism is disposed in the radially outer portion of the clutch plate 12, as is described in further detail below. Friction members are disposed on each side of the second friction disc 21 in the form of two driven plates 31, as described below.

Figure 2:
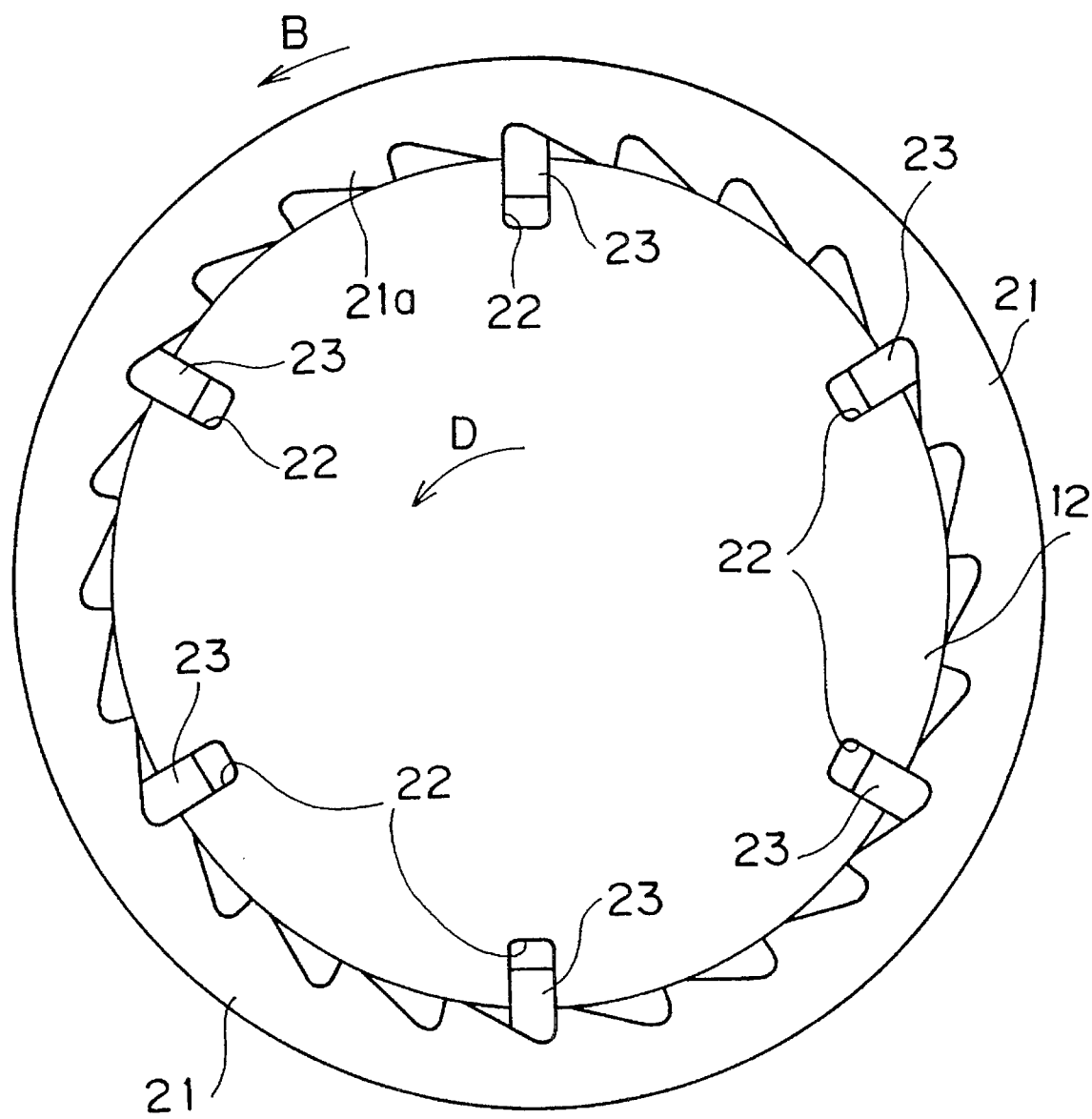
FIG. 2 is a front elevation of a one way mechanism of the present invention shown removed from the clutch device depicted in FIG. 1.

With reference to FIG. 2, six grooves 22 are radially formed in the radially outer portion of the clutch plate 12 with equal spacing in the circumferential direction. One way blocks 23 are respectively inserted into the grooves 22 so as to be capable of being drawn out by centrifugal forces. The head of each one way block 23 is formed in an inclined shape. The radially inner end of the second friction disc 21 is formed in serrations or teeth 21a, the slope of each of teeth corresponds to the head of the one way blocks 23.

If the clutch plate 12 rotates in the direction of driving D, the one way block 23 is caught by the teeth 21a in the radially inner end 21a of the second friction disc 21, whereby torque is transmitted. Each one way block 23 is projected outward by a centrifugal force at the time of rotation. On the other hand, if an engine brake is applied, torque is transmitted in the direction in which the engine brake is applied B from the second friction disc 21. In this case, if the second friction disc 21 rotates, the one way blocks 23 respectively retreat into the grooves 22 of the clutch plate 12. Therefore, the second friction disc 21 is idled.

A plate 24 for regulating the axial movement of the second friction disc 21 is fixed to a side surface of the clutch plate 12.

Returning again to FIG. 1, the output part 4 has a clutch outer case 30. The clutch outer case 30 has a cylinder part 30a covering the input part 3 and a sidewall 30b forming a side surface on the opposite side of the pressing mechanism 6. A spline hole 30c is formed in a radially inner portion of the cylinder part 30a. Driven plates 31, together with the first and second friction discs 20 and 21, forming the clutch body 5 is engaged with the spline hole 30c. The driven plates 31 are axially movable relative to the clutch outer case 30 but are fixed thereto in the direction of rotation. An output gear 32 is fixed to a radially inner portion of the sidewall 30b of the clutch outer case 30 by a rivet 33. The output gear 32 is rotatably supported oil the crankshaft 2 through a bearing 34. Further, the output gear 32 is engaged with a gear 36 fixed to an input shaft 35 of the transmission.

The pressing mechanism 6 has a pressure plate 40 in a substantially disc shape and a main cone spring 41 for urging the pressure plate 40 leftward in FIG. 1. Formed in a radially outer end of the pressure plate 40 is a spline shaft engaged with the spline hole 30c of the clutch outer case 30, whereby the pressure plate 40 is axially movable relative to the clutch outer case 30 and is fixed thereto in the direction of rotation.

The main cone spring 41 has its radially inner end locked in the pressure plate 40 and its radially outer end locked by a retaining ring 42 mounted on an end of the cylinder part 30a of the clutch outer case 30. The pressure plate 40 has its radially inner end rotatably supported on a release rod 44 through a bearing 43.

Furthermore, a sub-cone spring 45 for cushioning for alleviating a shock at the time of engaging the clutch as well as adjusting release load characteristics is disposed between the sidewall 30b of the clutch outer case 30 and the driven plates 31.

Description is now made of operations of the clutch device. In a clutch engaged state in which the release rod 44 is as depicted in FIG. 1, the pressure plate 40 is pressed against the sidewall 30b of the clutch outer case 30 by the main cone spring 41, whereby the friction discs 20 and 21 and the driven plate 31 are pressed against each other.

In this state, power transmitted from the crankshaft 2 to the input part 3 is transmitted to the clutch plate 12 through the torsion spring 13 serving as a damper mechanism from the spline hub 10. The power transmitted to the clutch plate 12 is transmitted to the clutch outer case 30 of the output part 4 through the friction discs 20 and 21 and the driven plate 31. Since the one way clutch mechanism is in its engaged state at the time of transmitting the power from the input part 3 to the output part 4 as described in FIG. 2, the second friction disc 21 contributes to power transmission.

The power transmitted to the clutch outer case 80 is transmitted to the gear 36 through the output gear 32, thereby being transmitted to the input shaft 35 of the transmission.

If an engine brake is applied to the motorcycle equipped with the clutch device 1 while the motorcycle is in motion, the power is transmitted from the output part 4 to the input part 3. In this case, the one way mechanism operates. The one way blocks 23 retract into the grooves 22, thus preventing power from being transmitted through the second friction disc 21. Rather, power can only be transmitted via the first friction disc 20. Therefore, the torque capacity is reduced by half at the time of applying the engine brake. Consequently, the clutch device 1 functions as a torque limiter. Therefore, it is possible to reduce the likelihood of tire slippage, thereby to increasing riding stability while traveling on a motorcycle employing the present invention.

When the release rod 44 is pulled rightward in FIG. 1 by a driver, the pressure plate 40 is moved rightward in FIG. 1 against an urging force of the main cone spring 41. Consequently, the pressure holding the friction discs 20 and 21 and the driven plate 31 against each other is released, whereby the clutch is disengaged.

The relationship between the force exerted by the main cone spring 41 and the sub-cone spring 45 verses displacement of the springs (via movement of the pressure plate 40) will now be described with reference to FIG. 3.

Figure 3:
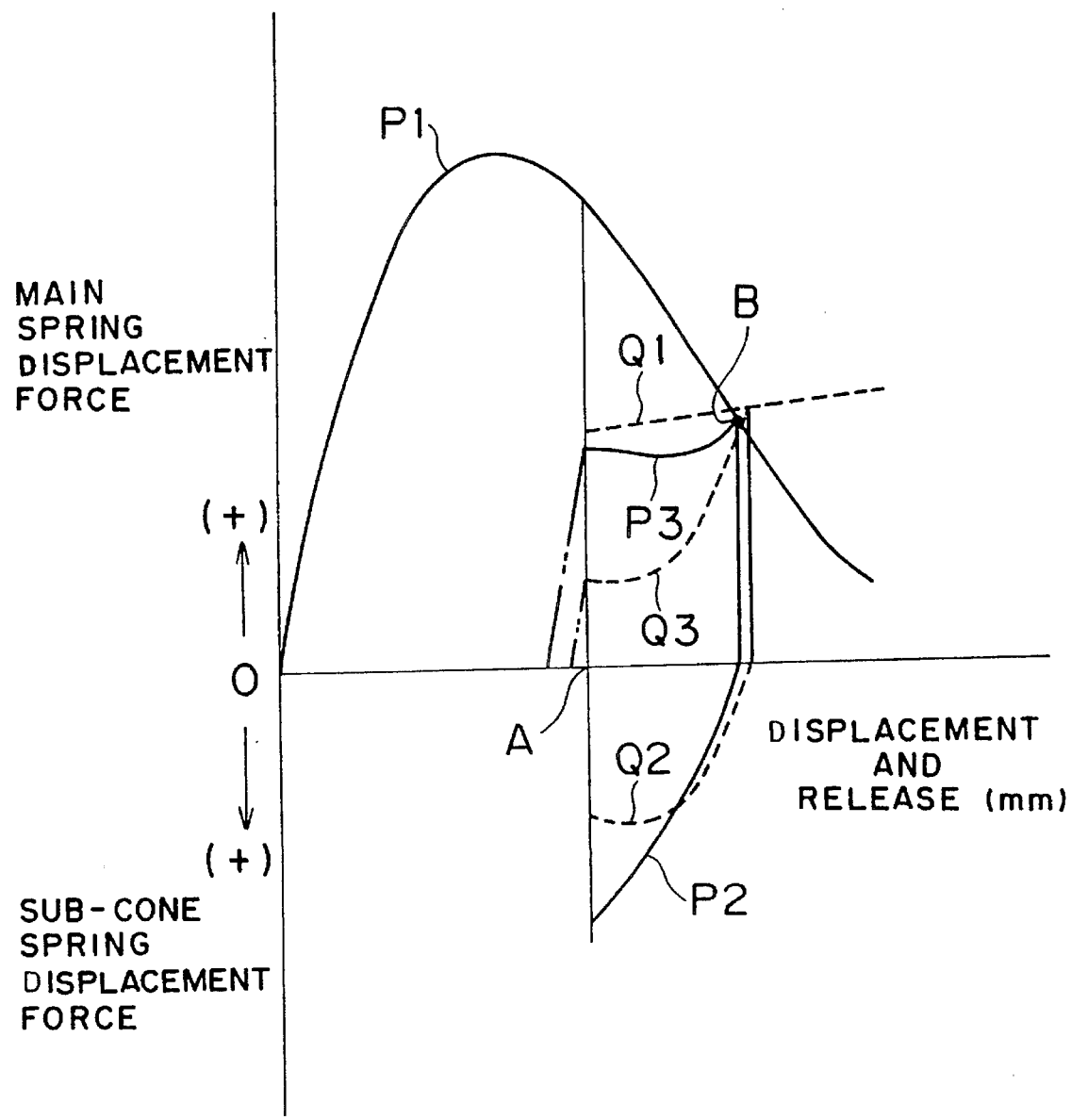
FIG. 3 is a diagram showing the pressing load characteristics and the release load characteristics of the clutch device depicted in FIG. 1.

The pressing force characteristics of the main cone spring 41 are indicated by a curve P1 In FIG. 3. The point A and corresponding vertical line In FIG. 3 which intersects point A, represents the clutch device 1 in a fully engaged state where the main cone spring 41 presses against pressure plate 40 to engage and compress the plates 20, 21 and 31, and at least partially compress the sub-cone spring 45. The pressing force characteristics of the sub-cone spring 45 are indicated by P2 in FIG. 3. The point B represents the displacement point where the force of the sub-cone spring 45 becomes negligible, and the pressure plate no longer exerts a force on the disk plates 20, 21 and 31. In other words, the clutch 1 at point B has become disengaged.

The curve P3 In FIG. 3 represents the combined forces of the main spring 41 and the sub-cone spring 45. As is apparent from an examination of the curve P3, the sub-cone spring 45 opposes the force of the main cone spring 41. Therefore, as the pressure plate 40 is moved toward the point B (as the release rod 44 is pulled rightward in FIG. 1 and the clutch 1 moved toward disengaged state) the sub-cone spring 45 reduces the force necessary to disengage the clutch, and overcome the force of the main cone spring 41.

As is apparent from a comparison of the curves P1 and P3, the force necessary to engage and disengage the clutch 1 is reduced by inclusion of the sub-cone spring 45, as compared to use of the main cone spring 41 alone. The effect of the force of the main cone spring 41 is decreased as the clutch device is disengaged, whereby a cushioning force of the sub-cone spring 45 (a force which opposes the pressure plate biasing) is gradually decreased. Therefore, release load characteristics obtained by combining the load characteristics of both the cone springs 41 and 45 are generally flat or near linear as indicated by P3 in FIG. 3.

The respective characteristics indicated by broken lines in FIG. 3 are the load characteristics of a conventional clutch device. Specifically, the pressing force or load characteristics in a case where a coil spring is used as the pressing means as in the conventional device are Q1, while the load characteristics of the cushion spring are Q2. Release load characteristics obtained by combining the characteristics Q1 of the coil spring and the load characteristics Q2 of the cushion spring are as indicated by Q3, in which the force necessary for disengagement of the clutch rapidly increases as the releasing operation is performed.

As described in the foregoing, according to the present embodiment, the clutch device is provided on the end of the crankshaft 2. Accordingly, the clutch capacity can be made smaller, as compared with that in the conventional clutch device, thereby to make it possible to decrease the weight and the amount of inertia. Further, the amount of inertia on the output side of the damper mechanism 3 can be increased for the same reason, thereby to make it easy to improve the vibration damping performance.

In the present embodiment, the pressure plate 40 is pressed by the main cone spring 41 and is balanced against the sub-cone spring 45 for cushioning, thereby to make it possible to decrease the release load as well as to almost flatten the release load characteristics. Accordingly, the releasing operation can be smoothly performed.

Furthermore, the torque capacity of the clutch is reduced by half by the one way clutch mechanism when the engine brake is applied. Particularly even when power exerted on the tires by the ground is small as in a motor bicycle, therefore, it is possible to reduce or prevent tire slippage when an engine brake is applied.

Figure 4:
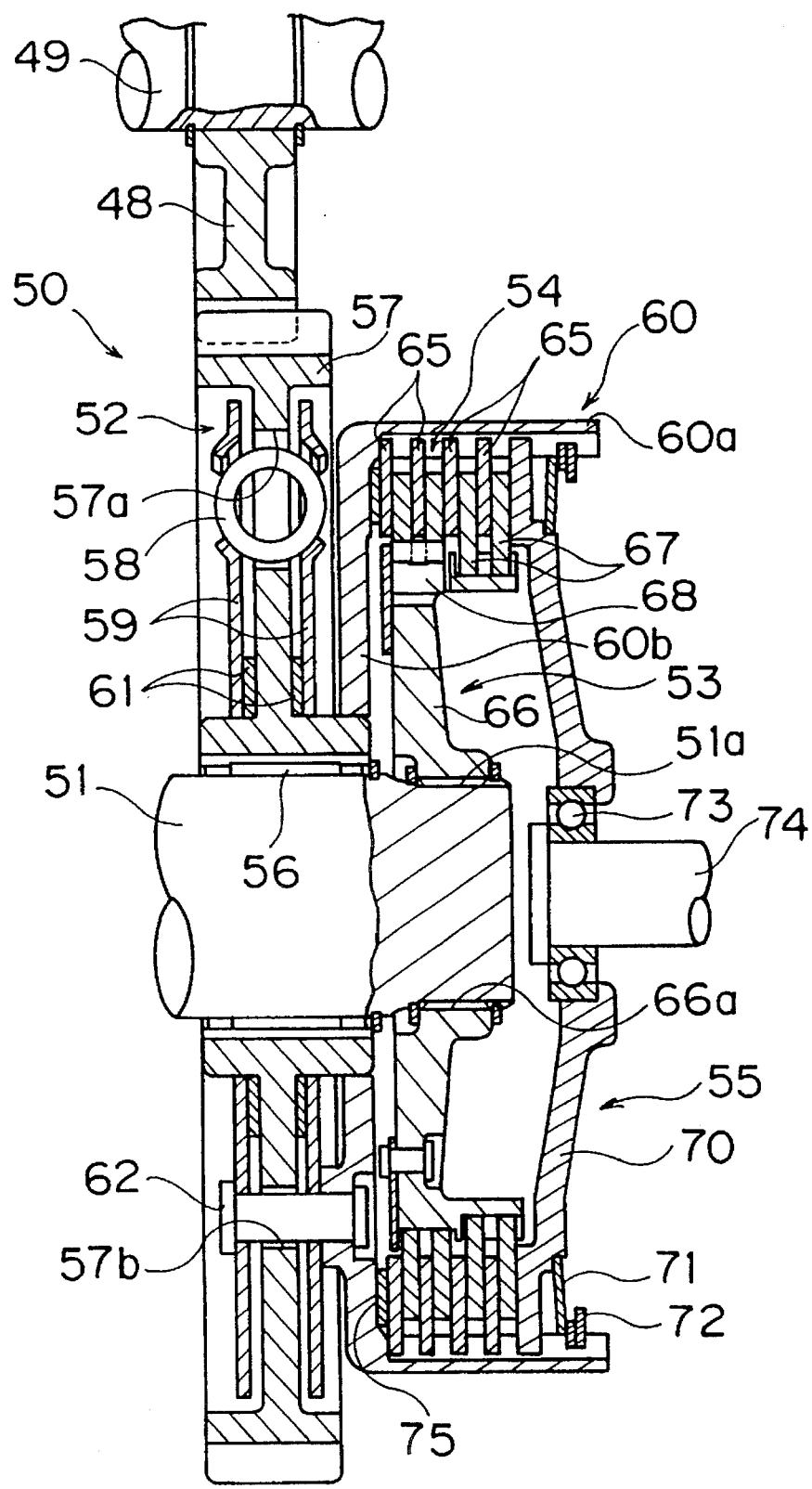
FIG. 4 is a side section showing a clutch device according to an alternate embodiment of the present invention.

With reference to FIG. 4, a clutch device according to a second embodiment of the present invention is now described.

The clutch device 50 is mounted on an end of an input shaft 51 of a transmission, and has an input part 52 to which power is transmitted from a crankshaft 49 on the engine side, an output part 53 fixed to the input shaft 51 of the transmission, a clutch body 54 disposed between the input part 52 and the output part 53, and a pressing mechanism 55 for pressing the clutch body 54.

The input part 52 has an input gear 57 rotatably supported on the input shaft 51 of the transmission through a needle bearing 56, a torsion spring 58 serving as a damper mechanism, a pair of side plates 59 for supporting the torsion spring 58, and a clutch outer case 60 connected to the side plates 59. The input gear 57 is engaged with a driving gear 48 fixed to the crankshaft 49 on the engine side. The torsion spring 58 is accommodated in a notch 57a formed in a radially intermediate portion of the input gear 57, and is supported by the side plates 59 on both its sides. A pair of friction washers 61 is disposed in a radially inner portion of the input gear 57 between the corresponding side plates 59 and the input gear 57.

The clutch outer case 60 has a cylinder part 60a in its radially outer portion and a sidewall 60b on the side of the input gear 57. The sidewall 60b of the clutch outer case 60 and the pair of side plates 59 are fixed to each other by a stop pin 62. The stop pin 62 passes through a hole 57b formed in the input gear 57. The hole 57b is formed so as to extend in the circumferential direction. Consequently, the side plates 59 and the clutch outer case 60 can rotate through a predetermined angle relative to the input gear 57.

Spline holes are formed in a radially inner portion of the cylinder part 60a of the clutch outer case 60. Four annular clutch plates 65 constituting the clutch body 54 are disposed in the spline holes. Formed in radially outer portions of the clutch plates 65 are respectively spline shafts, which are respectively engaged with the spline holes of the clutch outer case 60. Consequently, the clutch plate 65 are axially movable relative to the clutch outer case 60 and is fixed thereto in the direction of rotation.

The output part 53 has an output flange 66 in a substantially disc shape. Formed in a radially inner portion of the output flange 66 is a spline hole 66a, which is engaged with a spline shaft 51a formed in an end of the input shaft 51 of the transmission. Spline holes are formed on the side of the pressing mechanism 55 in a radially outer portion of the output flange 66, and two of four drive plates 67 constituting the clutch body 54 are engaged with the spline holes. The two other driven plates 67 are connected to the radially outer portion of the output flange 66 through a one way clutch mechanism of the same construction as that illustrated in the above described embodiment. Specifically, teeth in a serrated shape are formed in radially inner portions of the other driven plates 67, and a one way block 68 inserted into a groove in the radially outer portion of the output flange 66 so as to be capable of being drawn out. Friction members are fixed to both side surfaces of the driven plate 67.

The pressing mechanism 55 has a disc-shaped pressure plate 70 and a main cone spring 71 for urging the pressure plate 70. Formed in a radially outer portion of the pressure plate 70 are spline shafts, which are respectively engaged with the spline holes formed in the cylinder part 60a of the clutch outer case 60. Consequently, the pressure plate 70 is axially movable relative to the clutch outer case 60 and is fixed thereto in the direction of rotation. The main cone spring 71 has its radially inner end locked in the pressure plate 70 and its radially outer end locked by a retaining ring 72 fixed to an end of the cylinder part 60a of the clutch outer case 60. In addition, a radially inner end of the pressure plate 70 is rotatably supported on a release rod 74 through a bearing 73.

A sub-cone spring 75 for cushioning is disposed between the sidewall 60a of the clutch outer case 60 and the clutch plate 65. The relationship between the load characteristics of the sub-cone spring 75 and the main cone spring 71 is the relationship as illustrated in FIG. 3, as in the above described embodiment.

Power from the crankshaft 49 of the engine is transmitted to the input gear 57 through the driving gear 48. The power transmitted to the input gear 57 is transmitted to the clutch outer case 60 through the torsion spring 58 and the side plate 59. The power transmitted to the clutch outer case 60 is transmitted to the output flange 66 through the clutch plate 65 and the driven plate 67 which are pressed against each other, and is further transmitted to the input shaft 51 of the transmission.

When the engine brake is applied at the time of engaging the clutch, the one way clutch mechanism functions, whereby two of time four driven plates 67 do not contribute to power transmission, as in the above described embodiment. Therefore, a torque limiter function is performed when the engine brake is applied, thereby to make it possible to reduce the slippage of the tires of the motorcycle.

The release rod 74 is pulled rightward in FIG. 4 at the time of disengaging the clutch, whereby the pressure plate 70 is moved rightward against an urging force of the cone spring 71. Consequently, the pressing between the clutch plate 65 and the driven plate 67 is released, so that the clutch enters a disengaged state.

Release load characteristics at the time of a releasing operation are almost flattened by the function of the sub-cone spring 75, thereby to make it possible to smoothly perform a clutch operation, as in the above described embodiment.

Although the one way clutch mechanism serving as a torque limiter mechanism is disposed on the input side of the friction disc (input plate), while being disposed on the output side of the driven plate (output plate), the same effect as those in the above described embodiments are obtained no matter how it is disposed.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A clutch device for transmitting and disconnecting power between the crankshaft of a motorcycle engine and the input shaft of a manual transmission, comprising:

an hub assembly;

a first friction disk member coupled to said hub assembly for rotation therewith in both a first and a second rotational direction;

a second friction disk member coupled to said hub assembly for rotation therewith in only one of said directions;

an annular plate fixed to said hub extending radially beyond an outer circumference of said hub, limiting movement of said first and second friction disk members in a first axial direction;

a clutch case at least partially enclosing said hub assembly and said friction disk members;

at least one third friction disk member coupled to said clutch case for rotation therewith and extending between said first and second friction disks;

a pressure plate supported on said clutch case biased for pressing said friction disks into contact with each other within said clutch case.

2. A clutch device according to claim 1, further comprising a conical disk shaped spring supported within said clutch case which biases said pressure plate such that said conical disk shaped spring limits movement of said pressure plate and said first and second friction disks in a second axial direction.

3. A clutch device according to claim 2 wherein said conical disk shaped spring is configured to bias said pressure plate whereby force required to move said pressure plate decreases as said pressure plate disengages the clutch device.

4. A clutch device according to claim 3, further comprising a cushioning spring disposed between an inner portion of said clutch case and at least one of said friction disks biased to oppose the biasing of said pressure plate.

5. A clutch device according to claim 4 wherein said cushioning spring having a biasing response that combined with said conical disk shaped spring biasing response enables the force required to move said pressure plate to be at least partially near linear as said pressure plate disengages the clutch device.

6. A clutch device according to claim 1, wherein said second friction disk is formed with serrations on an inner radial surface thereof and wherein an outer radial portion of said hub assembly is provided with a plurality of radially retractable gear teeth configured to engage said serrations to allow for rotation of said second friction disk with respect to said hub assembly in said first direction and to cause rotation therewith in said second direction.

7. A clutch device according to claim 1 further comprising a vibration dampening mechanism disposed on said hub assembly.

8. A clutch device according to claim 1 further comprising a vibration dampening mechanism coupled to said clutch case.

9. A clutch device according to claim 1 wherein said pressure plate limits movement of said first and second friction disk members in a second axial direction and axially confines said first and second friction disks and said pressure plate within said clutch case.

10. A clutch device according to claim 1 further comprising at least one third friction disk member coupled to said clutch case for rotation therewith and extending between said first and second friction disks.

11. A clutch device for a motorcycle comprising:

an hub assembly supported by and fixed for rotation with a first shaft;

a first friction disk member coupled to said hub assembly for rotation therewith in both a first and a second rotational direction;

a second friction disk member coupled to said hub assembly for rotation therewith in only one of said directions;

an annular plate fixed to said hub extending radially beyond an outer circumference of said hub, limiting movement of said first and second friction disk members in a first axial direction;

a clutch case connected to a gear, said gear having gear teeth engageable with a second shaft and said gear being concentric with said hub assembly, said clutch case at least partially enclosing said hub assembly and said friction disk members;

a pressure plate supported on said clutch case biased for pressing said friction disks into contact with each other within said clutch case; and a conical disk shaped spring which biases said pressure plate thus limiting movement of said first and second friction disk members in a second axial direction.

12. A clutch device for a motorcycle as in claim 11 wherein said conical disk shaped spring provides a biasing response to said pressure plate whereby force required to move said pressure plate decreases as said pressure plate disengages the clutch device.

13. A clutch device for a motorcycle as in claim 11 further comprising a cushioning spring disposed between an inner portion of said clutch case and at least one of said friction disks biased to oppose the biasing of said pressure plate.

14. A clutch device for a motorcycle as in claim 13 wherein said cushioning spring having a biasing response that combined with said conical disk shaped spring biasing response enables the force required to move said pressure plate to be at least partially near linear as said pressure plate disengages the clutch device.

15. A clutch device for a motorcycle as in claim 11 wherein said second friction disk is formed with serrations on an inner radial surface thereof and wherein an outer radial portion of said hub assembly is provided with a plurality of radially retractable gear teeth configured to engage said serrations to allow for rotation of said second friction disk with respect to said hub assembly in said first direction and to cause rotation therewith in said second direction.

16. A clutch device according to claim 11 further comprising a vibration dampening mechanism disposed on said hub assembly.

17. A clutch device according to claim 11 further comprising a vibration dampening mechanism disposed on said gear, said vibration dampening mechanism connected to said clutch case allowing limited relative rotation between said clutch case and said gear.

* * * * *